Patented May 2, 1939

2,156,299

UNITED STATES PATENT OFFICE 2,156,299

WELDING ROD

Franz Leitner, Kapfenberg, Austria, assignor to Gebr. Bohler & Co. Aktiengesellschaft Wien, Vienna, Germany No Drawing. Application March 19, 1937, Serial No. 131,865. In Austria April 25, 1936

5 Claims. (Cl. 219—8)

The invention relates to welding and more specifically to austenitic steel welding rods for welding nonaustenitic steel alloys, and to new and useful welded articles.

Although the invention is of particular advantage in electric welding, it may be applied to any type of fusion-deposition welding.

Heretofore, nickel steels, including those containing one or more elements of the group consisting of chromium, manganese, and molybdenum, have been employed as austenitic steel welding rods. A disadvantage of these steels when used for this purpose is that they require large amounts of electricity for the deposition of relatively small quantities of weld filler material, resulting in a slow welding speed.

It is an object of this invention to provide austenitic steel welding rods for welding non-austenitic steel alloys, which rods will be free from the disadvantages common to the austenitic steel welding rods previously used. A further object of the invention is the production of welded steel articles by the use of the welding rods described, which articles comprise at least two contiguous members of nonaustenitic steel bonded by a fusion-deposited weld of austenitic steel.

I have discovered that certain chromium-manganese steels, when used in welding rods, possess the favorable properties of the alloys heretofore used, and in addition, deposit a considerably larger quantity of weld filler material of high ductility for the same amount of electricity, and therefore allow a very high welding speed. Furthermore, these alloys may be used in the "as drawn" condition and have the advantage of being very inexpensive.

According to the invention, nonaustenitic steel members are welded with an austenitic steel alloy welding rod containing carbon in an amount not exceeding 0.35%, 13% to 26% manganese, and 3% to 15% chromium, the chromium content being approximately equal to half of the manganese content but never more than 6% above or below that figure, the remainder principally iron. The alloy welding rod also may contain nickel in an amount not exceeding 4%. In a specific example of my invention, an alloy steel welding rod containing 0.10% carbon, 22% manganese, and 12% chromium, the remainder substantially all iron, gave the following values in tests of the deposited metal:

Tensile strength _____ pounds/sq. in __ 78,228
Ductility (L=5d) _____ per cent __ 38
Impact strength (Mesnager)
            foot pounds/cm² __ 137.4

In order to obtain good penetration, elements which raise the melting point of the welding material may be included. Elements which may be added without any risk of decreasing the uniformity or increasing the porosity of the weld filler material include cobalt in an amount not exceeding 8%, and one or more of the elements of the group consisting of tantalum, tungsten, vanadium, titanium, zirconium, molybdenum, and copper in an amount not exceeding 3% of the entire composition. Examples of typical alloy compositions are:

| | | | |
|---|---|---|---|
| Carbon | 0.10% | 0.10% | 0.18% |
| Manganese | 14.00% | 25.00% | 15.00% |
| Chromium | 11.00% | 12.00% | 6.00% |
| Nickel | | 1.50% | 4.00% |
| Molybdenum | | 2.00% | |
| Cobalt | | | 5.00% |

Welding rods prepared according to my invention are particularly suitable for welding in successive layers. Deposited metal from the welding rods of the invention has good tensile properties and high ductility. Welding speed may be increased, particularly in electric welding methods, without increase in the amount of electricity required.

It is especially important that the limits of my invention be strictly adhered to in multi-layer welding, because chromium-manganese steel welding rods lying outside the limits described above produce brittle welds when a layer, previously deposited, is reheated during the deposition of a subsequent layer.

I claim:

1. Austenitic steel welding rod for fusion welding of non-austenitic alloy steels, which rod contains carbon in an amount not exceeding 0.35%; 13% to 26% manganese; 3% to 15% chromium, the chromium content being approximately equal to one half the manganese content; and the remainder principally iron.

2. Austenitic steel welding rod for fusion welding of non-austenitic alloy steels, which rod contains carbon in an amount not exceeding 0.35%; 13% to 26% manganese; 3% to 15% chromium, the chromium content being within the limits of 6% above and below one half the manganese content; nickel in an amount not exceeding 4%; and the remainder principally iron.

3. Austenitic steel welding rod for fusion welding of non-austenitic alloy steels, which rod contains carbon in an amount not exceeding 0.35%; 13% to 26% manganese; 3% to 15% chromium, the chromium content being within the limits of 6% above and below one half the manganese content; at least one element of the group consisting of tantalum, tungsten, vanadium, titanium, zirconium, and molybdenum, in an amount not exceeding a total of 3% of the entire composition; and the remainder being substantially all iron.

4. Austenitic steel welding rod for fusion welding of non-austenitic alloy steels, which rod contains carbon in an amount not exceeding 0.35%; 13% to 26% manganese; 3% to 15% chromium, the chromium content being within the limits of 6% above and below one half the manganese content; nickel in an amount not exceeding 4%; at least one element of the group consisting of tantalum, tungsten, vanadium, titanium, zirconium, and molybdenum, in an amount not exceeding a total of 3% of the entire composition; the remainder being substantially all iron.

5. Austenitic steel welding rod for fusion welding of non-austenitic alloy steels; which rod contains carbon in an amount not exceeding 0.35%; 13% to 26% manganese; 3% to 15% chromium, the chromium content being within the limits of 6% above and below one half the manganese content; nickel in an amount not exceeding 4%; cobalt in an amount not exceeding 8%; and the remainder substantially all iron.

FRANZ LEITNER.